United States Patent
Meeuwissen et al.

(10) Patent No.: US 9,447,736 B2
(45) Date of Patent: Sep. 20, 2016

(54) METHOD FOR SWITCHING OVER A GAS TURBINE PLANT FROM GASEOUS FUEL TO LIQUID FUEL AND VICE-VERSA

(75) Inventors: Thiemo Meeuwissen, Ennetbaden (CH); Stanka Kokanovic, Berlin (DE); Susanne Schell, Baden (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 1136 days.

(21) Appl. No.: 12/876,346

(22) Filed: Sep. 7, 2010

(65) Prior Publication Data
US 2011/0126546 A1   Jun. 2, 2011

(30) Foreign Application Priority Data
Sep. 7, 2009 (EP) .................................... 09169610

(51) Int. Cl.
F02C 6/00 (2006.01)
F02C 9/40 (2006.01)
F23R 3/36 (2006.01)

(52) U.S. Cl.
CPC ................ F02C 9/40 (2013.01); F02C 6/003 (2013.01); F23R 3/36 (2013.01); F23R 2900/03341 (2013.01)

(58) Field of Classification Search
CPC .............. F02G 3/00; F02C 9/42; F02C 6/02; F02C 6/003; F02C 9/40; B64D 31/12; Y02E 20/16; Y02E 20/18; F23R 2900/03341; F23R 3/34; F23R 3/346; F23D 17/002
USPC ...... 60/225, 774, 724, 39.15, 39.17, 39.463, 60/39.62, 39.63
See application file for complete search history.

(56) References Cited

U.S. PATENT DOCUMENTS

| | | | | |
|---|---|---|---|---|
| 2,677,930 | A | * | 5/1954 | Carr ................................. 60/243 |
| 2,933,894 | A | * | 4/1960 | Johnson et al. ........... 60/39.281 |
| 3,577,877 | A | * | 5/1971 | Warne ........................ 60/39.281 |
| 3,948,043 | A | * | 4/1976 | Martz ............................. 60/243 |
| 4,151,712 | A | * | 5/1979 | Martens et al. ........... 60/39.281 |
| 5,465,569 | A | * | 11/1995 | Althaus et al. ................. 60/773 |
| 5,761,895 | A | * | 6/1998 | Chu et al. ........................ 60/773 |
| 7,770,400 | B2 | * | 8/2010 | Iasillo et al. .................... 60/776 |

(Continued)

FOREIGN PATENT DOCUMENTS

DE 1476846 6/1969
WO WO2007/141101 12/2007

OTHER PUBLICATIONS

Felix Guthe, The Reheat Concept: The Proven Pathway to Ultralow Emissions and High Efficiency and Flexibility, Journal of Engineering for Gas Turbines and Power, Mar. 2009, vol. 131, pp. 021503-1 to 021503-7.*

(Continued)

Primary Examiner — Gerald L Sung
Assistant Examiner — Alain Chau
(74) Attorney, Agent, or Firm — Buchanan Ingersoll & Rooney PC

(57) ABSTRACT

In a method for switching over a gas turbine plant from gaseous fuel (16, 20) to liquid fuel (18, 22) and vice-versa, in which the gas turbine plant includes a first combustor and a second combustor fed with the flue gases of the first combustor, the first and second combustors are sequentially switched over while the other combustor maintains its operating conditions.

10 Claims, 2 Drawing Sheets

(56) References Cited

U.S. PATENT DOCUMENTS

2007/0033945 A1* 2/2007 Goldmeer et al. ............. 60/774
2008/0154474 A1   6/2008 Iasillo et al.
2009/0094960 A1* 4/2009 Eroglu et al. ................ 60/39.12

OTHER PUBLICATIONS

European Search Report for EP Patent App. No. 09169610.4 (Mar. 22, 2010).

Meherwan P. Boyce, "Gas Turbine Engineering Handbook", $4^{th}$ ed., p. 729 (Elsevier 2012), Oxford, UK. https://books.google.com/books?id=owLqP3prEmsC&pg=PA729&lpg=PA729&dg=gas+turbine+synchronization&source=bl&ots=Zhzd-A8aBS&sig=3kxANXHsau4_IFdEwDHFiQ_kFrQ&hl=de&sa=X&ei=CvWBVeCtMISuswGz8oCABw&ved=OCEAQ6AEwCDgK#v=onepage&q=gas%20turbine%20synchronization&f=false.

* cited by examiner

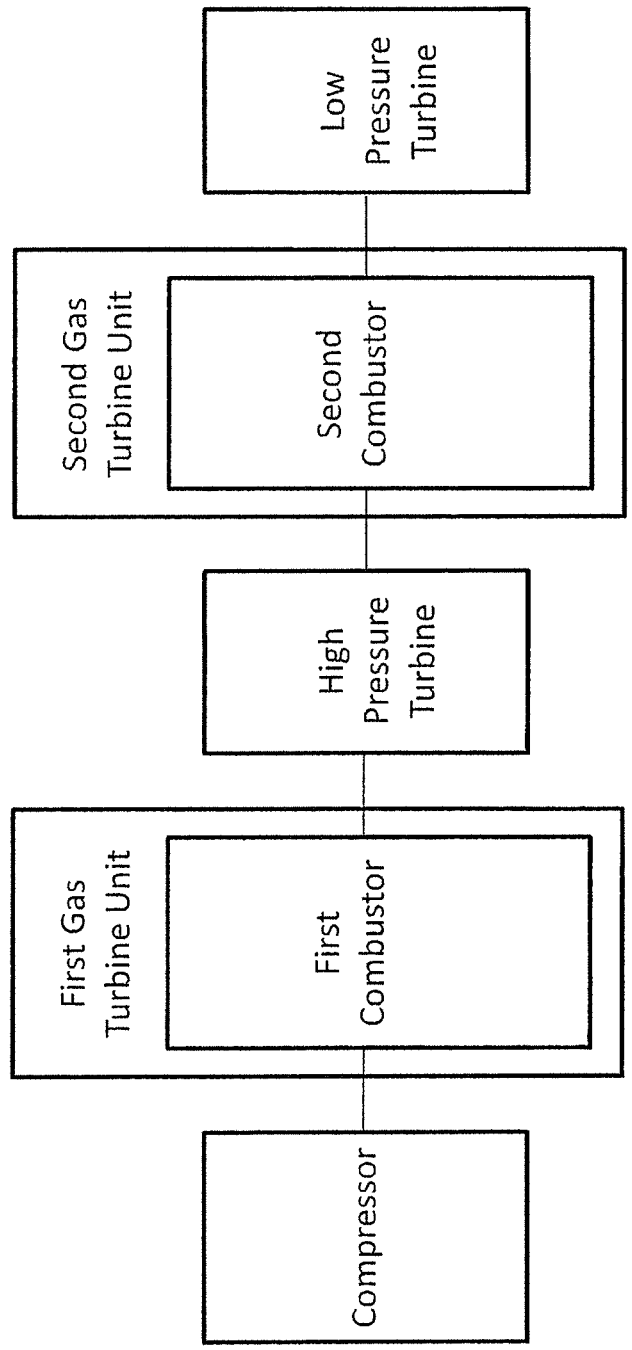

METHOD FOR SWITCHING OVER A GAS TURBINE PLANT FROM GASEOUS FUEL TO LIQUID FUEL AND VICE-VERSA

This application claims priority to European application No. 09169610.4, filed 7 Sep. 2009, the entirety of which is incorporated by reference herein.

BACKGROUND

1. Field of Endeavor

The present invention relates to a method for switching over a gas turbine plant from gaseous fuel to liquid fuel and vice-versa.

In particular, methods embodying principles of the present invention may be implemented in gas turbine plants having at least two combustors, wherein the second combustor is fed with the flue gases from the first combustor.

In this respect, for example the gas turbine plant for implementing a method of the present invention may include sequential combustion gas turbine units, i.e., gas turbine units having in series a compressor, a first combustor, a high pressure turbine, a second combustor fed with the flue gases of the first combustor, and a low pressure turbine.

Alternatively, a method of the invention may also be implemented in gas turbine plants having superimposed gas turbine units, i.e., a first gas turbine unit having in series a compressor, a first combustor, and a high pressure turbine and a second gas turbine unit fed with the flue gases of the first gas turbine unit having a compressor, a second combustor, and a low pressure turbine.

Naturally also gas turbine plants with sequential combustion gas turbine units together with gas turbine units are possible.

For sake of simplicity in the following, reference to a sequential combustion gas turbine will be made; it is anyhow clear that the same considerations apply to gas turbine plans made of superimposed (sequential) gas turbine units.

2. Brief Description of the Related Art

Switching over a sequential combustion gas turbine is a very delicate and complicated operation, since modification of the operating conditions of one combustor influences the operating conditions of the other combustor and, in addition, the stringent restrictions imposed by the emission limits (CO, UHC, and $NO_x$ emissions), flame temperature, and flame stability must be respected.

For these reasons, traditionally switch over from gas fuel operation to liquid fuel operation or vice-versa of a gas turbine plant operation is carried out by de-loading the gas turbine plant, thus switching off the second combustor, then switching over the first combustor and finally reigniting (with a different fuel) also the second combustor and loading up again the gas turbine plant.

Nevertheless, this traditional switch over method, that requires de-loading and re-loading of the gas turbine plant may adversely influence the final load, such as an electric generator, because during switch over no electric power or a reduced amount of electric power may be generated.

In addition, the large number of actions required for fuel switching over subjects the gas turbine plants (and in particular the first and second combustors) to temperature and load swings that adversely affect their lifetime.

SUMMARY

One of numerous aspects of the present invention is therefore to provide a method by which the aforementioned problems of the known art are addressed.

Another aspect includes a method with which no de-loading and re-loading are needed, such that the gas turbine plant may deliver mechanical power also during switch over.

In particular, with a method according to principles of the present invention, the gas turbine plant may deliver a substantially constant mechanical power also during switch over.

Another aspect of the invention includes a method that reduces the number of actions to be carried out for fuel switching over, such that also temperature and load swings are drastically reduced with a benefit for the gas turbine plant lifetime.

BRIEF DESCRIPTION OF THE DRAWINGS

Further characteristics and advantages of the invention will be more apparent from the description of a preferred but non-exclusive embodiment of the method according to the invention, illustrated by way of non-limiting example in the accompanying drawings, in which:

FIG. 3 is a diagram showing an exemplary arrangement of a sequential combustion gas turbine.

DETAILED DESCRIPTION OF EXEMPLARY EMBODIMENTS

Methods embodying principles of the present invention may be implemented in gas turbine plants that have at least two combustors, a first combustor typically fed with compressed air and a fuel, and a second combustor fed with the flue gases from the first combustor and further fuel.

In this respect, a gas turbine plant useful for implementing embodiments of the invention may include a sequential combustion gas turbine unit or a first gas turbine unit that supplies its flue gases to a second gas turbine unit (in the latter case one or both the gas turbine units could also be sequential gas turbine units).

Exemplary methods for switching over a gas turbine plant from gaseous fuel to liquid fuel and vice-versa include sequentially switching over the first and the second combustor, while the other combustor maintains its operating conditions.

In other words, switch over is carried out in line.

In particular, while the first or second combustor is switched over, the other combustor is regulated at a substantially constant fuel flow rate.

Moreover, during switch over the first combustor operates at least partially with liquid fuel, while the second combustor operates at least partially with gaseous fuel.

This lets the first combustor operate with liquid fuel or at least partially with liquid fuel and the second combustor operate with gaseous fuel or at least partially with gaseous fuel during switch over.

As during operation with liquid fuel, the temperature is generally lower than during operation with gaseous fuel, the temperature of the flue gases fed from the first combustor to the second combustor is generally lower such that flashback risks at the second combustor are reduced.

In particular, during switch over from gaseous to liquid fuel, the first combustor is switched over before the second combustor; this lets the temperatures be better controlled and the flashback risks at the second combustor be reduced.

In contrast, during switch over from liquid to gaseous fuel, the second combustor is switched over before the first combustor; this lets the pressure pulsations be better controlled and reduced.

In some cases, between the sequential switch over of the first and second combustor a delay time is provided.

Figure 1:
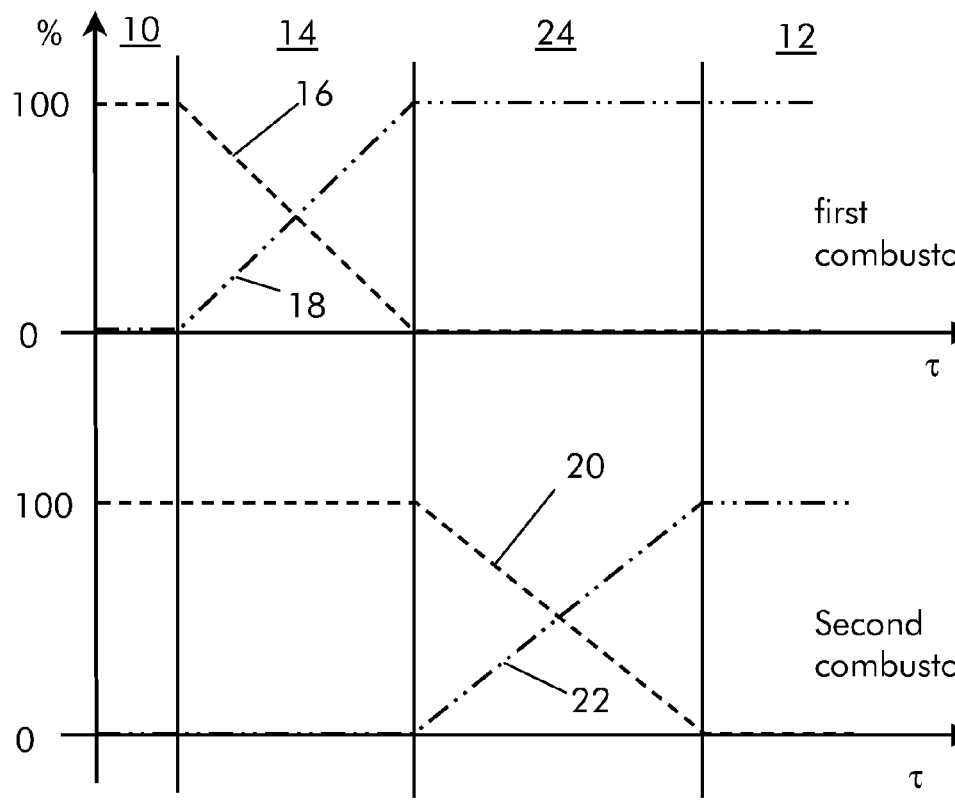
FIG. 1 is diagram showing an embodiment of a method during switch over from gaseous fuel to liquid fuel operation.

FIG. 1 shows in detail a switch over from gaseous fuel to liquid fuel; in particular FIG. 1 shows the gaseous and liquid fuel flow in relation to time t.

Reference 10 indicates a zone of gaseous fuel operation and reference 12 indicates a zone of liquid fuel operation of the gas turbine plant.

During switch over, in a first period 14 the gaseous fuel flow 16 in the first combustor decreases from 100% to 0%, whereas liquid fuel flow 18 in the first combustor increases from 0% to 100%; simultaneously the second combustor maintains its operating conditions and thus gas fuel flow 20 in the second combustor remains at 100% while liquid fuel flow 22 in the second combustor remains at 0%.

In a second subsequent period 24, the first combustor maintains its operating conditions while the second combustor switches over; in this respect liquid fuel flow 18 in the first combustor remains at 100% and gaseous fuel flow 16 in the first combustor remains at 0%, while gaseous fuel flow 20 in the second combustor decreases from 100% to 0% and liquid fuel flow 18 in the second combustor increases from 0% to 100%.

At the end of period 24 both first and second combustors have switched over in line from gaseous to liquid fuel.

Figure 2:
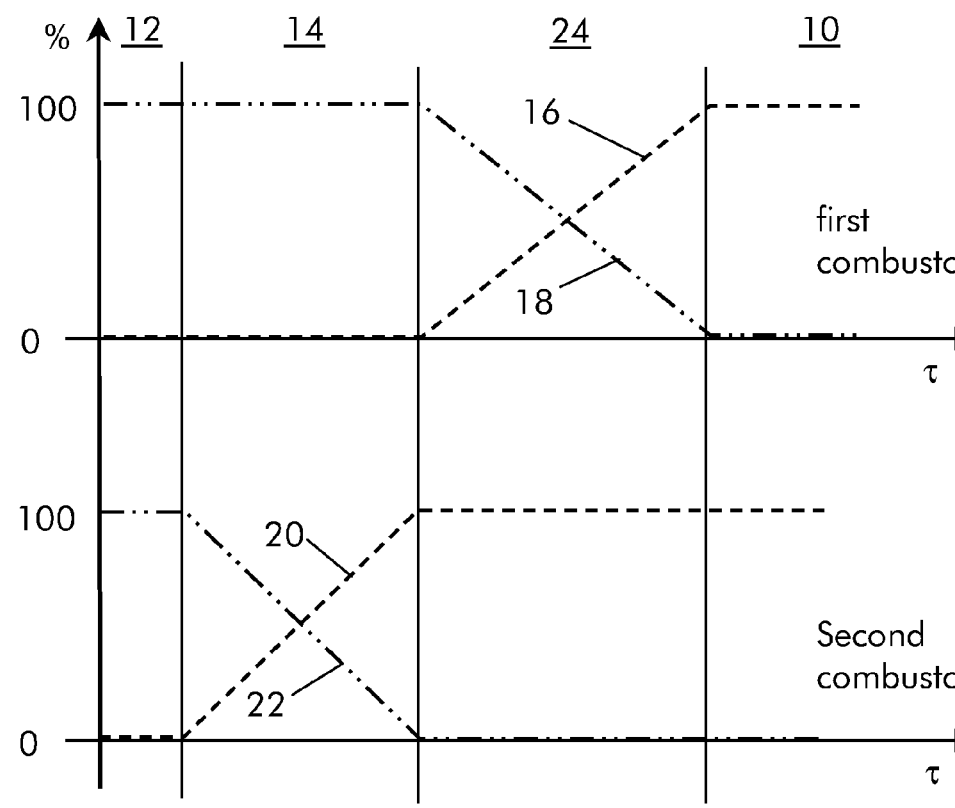
FIG. 2 is a diagram showing an embodiment of a method during switch over from liquid fuel operation to gaseous fuel operation.

FIG. 2 shows in detail a switch over from liquid fuel to gaseous fuel; in particular FIG. 2 shows the gaseous and liquid fuel flow in relation to time t.

Also in this case reference 10 indicates a zone of gaseous fuel operation and reference 12 indicates a zone of liquid fuel operation of the gas turbine plant.

During switch over, in a first period 14 liquid fuel flow 18 in the first combustor remains at 100% while gaseous fuel flow 16 in the first combustor remains at 0%. Simultaneously, liquid fuel flow 22 in the second combustor decreases from 100% to 0% and gaseous fuel flow 20 in the second combustor increases from 0% to 100%.

In a second period 24, the second combustor maintains its operating conditions while the first combustor switches over; in this respect liquid fuel flow 22 in the second combustor remains at 0% and gaseous fuel flow 20 in the second combustor remains at 100%; simultaneously liquid fuel flow 18 in the first combustor decreases from 100% to 0% and gaseous fuel flow 16 in the first combustor increases from 0% to 100%.

At the end of period 24 both first and second combustors have switched over in line from liquid to gaseous fuel.

Naturally the features described may be independently provided from one another.

Methods embodying principles of the present invention allow a continuous load operation also during fuel switch over, without de-loading and major load swings.

Moreover, in case of sequential combustion gas turbine plants, shut off of consumer with higher fuel gas pressure requirements first (typically the first combustor), allows more time for the fuel switch over in case of an emergency fuel switch over due to fuel gas pressure drop. In this case, the consumer with the lower gas pressure requirements (typically the second combustor) can still be operated and switched over when the pressure for the consumer with the high pressure requirements (typically the first combustor) is not sufficient.

In practice the materials used and the dimensions can be chosen at will according to requirements and to the state of the art.

REFERENCE NUMBERS 10 zone of gas fuel operation
12 zone of liquid fuel operation
14 first period of switch over
16 gaseous fuel flow in the first combustor
18 liquid fuel flow in the first combustor
20 gas fuel flow in the second combustor
22 liquid fuel flow in the second combustor
24 second period of switch over While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method for switching over a sequential combustion gas turbine during continuous load operation from gaseous fuel to liquid fuel and from liquid fuel to gaseous fuel, wherein said sequential combustion gas turbine has in sequence: a first combustor, a second combustor fed with flue gases of the first combustor, and a high-pressure turbine upstream of the second combustor and a low-pressure turbine downstream of the second combustor, the method comprising:
   sequentially switching over one of the first and second combustors while the other of the first and second combustors maintains a fuel flow rate to be substantially constant, and the sequential combustion gas turbine is controlled to deliver a substantially constant mechanical power during the switch over,
   wherein, during switch over from gaseous fuel to liquid fuel, the first combustor is switched over before the second combustor, and
   wherein, during switch over from liquid fuel to gaseous fuel, the second combustor is switched over before the first combustor.

2. A method as claimed in claim 1, wherein, during switch over, the first combustor operates at least partially with liquid fuel, while the second combustor operates at least partially with gaseous fuel.

3. A method as claimed in claim 1, further comprising: between the sequential switch over of the first and second combustor, providing a time delay.

4. A method as claimed in claim 1, wherein said gas turbine has a first gas turbine unit having said first combustor and a second gas turbine unit having said second combustor.

5. A method as claimed in claim 1, wherein during switchover from liquid fuel to gaseous fuel, in a first period, liquid fuel flow in the first combustor remains constant and simultaneously, liquid fuel flow in the second combustor decreases from 100% to 0% and gaseous fuel flow in the second combustor increases from 0% to 100%, and in a second period, the gaseous fuel flow in the second combustor remains constant and simultaneously, the liquid fuel flow in the first combustor decreases from 100% to 0% and gaseous fuel flow in the first combustor increases from 0% to 100%.

6. A method as claimed in claim 1, wherein during switchover from gaseous fuel to liquid fuel, in a first period, gaseous fuel flow in the second combustor remains constant and simultaneously, gaseous fuel flow in the first combustor decreases from 100% to 0% and liquid fuel flow in the first combustor increases from 0% to 100%, and in a second period, the liquid fuel flow in the first combustor remains constant and simultaneously, the gaseous fuel flow in the second combustor decreases from 100% to 0% and liquid fuel flow in the second combustor increases from 0% to 100%.

7. A method as claimed in claim 1, comprising:
controlling, during switchover from gaseous fuel to liquid fuel, gaseous fuel flow in the first combustor decreases while liquid fuel flow in the first combustor increases, and while the gaseous fuel flow in the first combustor decreases and the liquid fuel flow in the first combustor increases, gaseous fuel flow in the second combustor remains constant.

8. A method as claimed in claim 7, comprising:
controlling, during the switchover from gaseous fuel to liquid fuel, gaseous fuel flow in the second combustor decreases while liquid fuel flow in the second combustor increases, and while the gaseous fuel flow in the second combustor decreases and the liquid fuel flow in the second combustor increases, liquid fuel flow in the first combustor remains constant.

9. A method as claimed in claim 1, comprising:
controlling, during switchover from liquid fuel to gaseous fuel, liquid fuel flow in the first combustor decreases while gaseous fuel flow in the first combustor increases, and while the liquid fuel flow in the first combustor decreases and the gaseous fuel flow in the first combustor increases, gaseous fuel flow in the second combustor remains constant.

10. A method as claimed in claim 9, comprising:
controlling, during the switchover from liquid fuel to gaseous fuel, liquid fuel flow in the second combustor decreases while gaseous fuel flow in the second combustor increases, and while the liquid fuel flow in the second combustor decreases and the gaseous fuel flow in the second combustor increases, liquid fuel flow in the first combustor remains constant.

* * * * *